(12) United States Patent
Winterton

(10) Patent No.: US 7,787,403 B2
(45) Date of Patent: Aug. 31, 2010

(54) APPARATUS AND METHOD FOR ADJUSTING A DUTY CYCLE TO SAVE POWER IN A COMPUTING SYSTEM

(75) Inventor: Richard R. Winterton, Provo, UT (US)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 11/022,213

(22) Filed: Dec. 23, 2004

(65) Prior Publication Data

US 2006/0140218 A1 Jun. 29, 2006

(51) Int. Cl.
*G08C 17/00* (2006.01)
(52) U.S. Cl. .................. 370/311; 370/503; 455/522; 713/300
(58) Field of Classification Search .......... 370/311, 370/318, 229, 231, 463, 419, 401, 465, 459, 370/458, 450, 394, 420, 522; 455/522; 713/300, 713/320, 323, 324, 330, 340
See application file for complete search history.

(56) References Cited

U.S. PATENT DOCUMENTS

| | | | |
|---|---|---|---|
| 5,861,822 A | 1/1999 | Park et al. | |
| 5,884,187 A * | 3/1999 | Ziv et al. | 455/522 |
| 6,480,476 B1 | 11/2002 | Willars | |
| 6,571,089 B1 * | 5/2003 | Richards et al. | 455/266 |
| 6,795,450 B1 * | 9/2004 | Mills et al. | 370/463 |
| 7,317,691 B2 * | 1/2008 | Mills et al. | 370/252 |
| 2002/0142791 A1 * | 10/2002 | Chen et al. | 455/522 |
| 2003/0022686 A1 | 1/2003 | Soomro et al. | |
| 2003/0091017 A1 | 5/2003 | Davenport et al. | |
| 2003/0161348 A1 | 8/2003 | Mills et al. | |
| 2003/0194979 A1 * | 10/2003 | Richards et al. | 455/216 |
| 2004/0190507 A1 | 9/2004 | Wu et al. | |

FOREIGN PATENT DOCUMENTS

| | | |
|---|---|---|
| EP | 1 237 328 A | 9/2002 |
| EP | 1 357 704 A | 12/2003 |
| KR | 2003-85082 | 11/2003 |
| KR | 10-2004-0020638 | 3/2004 |
| WO | WO 00/22837 A2 | 4/2000 |
| WO | WO 01/99384 A | 12/2001 |

(Continued)

OTHER PUBLICATIONS

Yuen, J. et al., "Adaptive buffer sensitive scheduling for transmitting video streams in a mobile multimedia system," Real-time Technology and Applications Symposium 2001.

(Continued)

*Primary Examiner*—Jason E Mattis
*Assistant Examiner*—Dady Chery
(74) *Attorney, Agent, or Firm*—Schwabe, Williamson & Wyatt, P.C.

(57) ABSTRACT

A method and system for adjusting a duty cycle to save power in a computing system is described. The system includes a network interface card (NIC) that has an active mode and a sleep mode. The NIC is coupled to an adjusting element that adjusts a duty cycle of the active time to the sleep time based at least in part on minimizing power consumption.

17 Claims, 3 Drawing Sheets

FOREIGN PATENT DOCUMENTS

| WO | WO 02/47321 A | 6/2002 |
| WO | WO 03/003657 A1 | 9/2003 |
| WO | WO2006071821 A2 | 7/2006 |

OTHER PUBLICATIONS

Proceedings, Seventh IEEE Taipei, Taiwan, May 30, 2001, pp. 125-126. XP010550103.

PCT Notification of Transmittal of the International Search Report and Written Opinion of the International Searching Authority, or the Declaration, Jun. 20, 2006, 17 pages.
PCT Notification Concerning Transmittal of Copy of International Preliminary Report on Patentability, Jul. 5, 2007, 10 pages.
Korean Patent Application No. 10-2007-7014194, KIPO's Notice of Preliminary Rejection issued Sep. 26, 2008, 8 pages.
Chinese Patent Application No. 200580044325.9, Chinese First Office Action issued May 22, 2009, 15 pages.

* cited by examiner

APPARATUS AND METHOD FOR ADJUSTING A DUTY CYCLE TO SAVE POWER IN A COMPUTING SYSTEM

TECHNICAL FIELD

Embodiments of the invention relate to saving power in a computing system, and more specifically to adjusting a duty cycle of a network interface card to save power in a computing system.

BACKGROUND

The use of mobile or wireless devices has been increasing. However, using mobile devices to receive streaming data or large file transfers over a network consumes significant amounts of power. To save power, the network interface card (NIC) may be put into a low power state, such as a sleep mode, until it receives a request to wake up to receive or transmit data. For example, the NIC may wake up when it receives a request from an access point to receive data. The NIC may then receive data that has been buffered by the access point for the wireless device. One problem with this technique is that some applications, such as streaming applications, require time critical data. If the streaming application runs out of data, the stream is interrupted, and the user will not have a good experience. However, if the user can only use the device for a short period of time while receiving streaming data, then use of the device is also not desired.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Embodiments of a system and method for adjusting a duty cycle to save power in a computing system are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
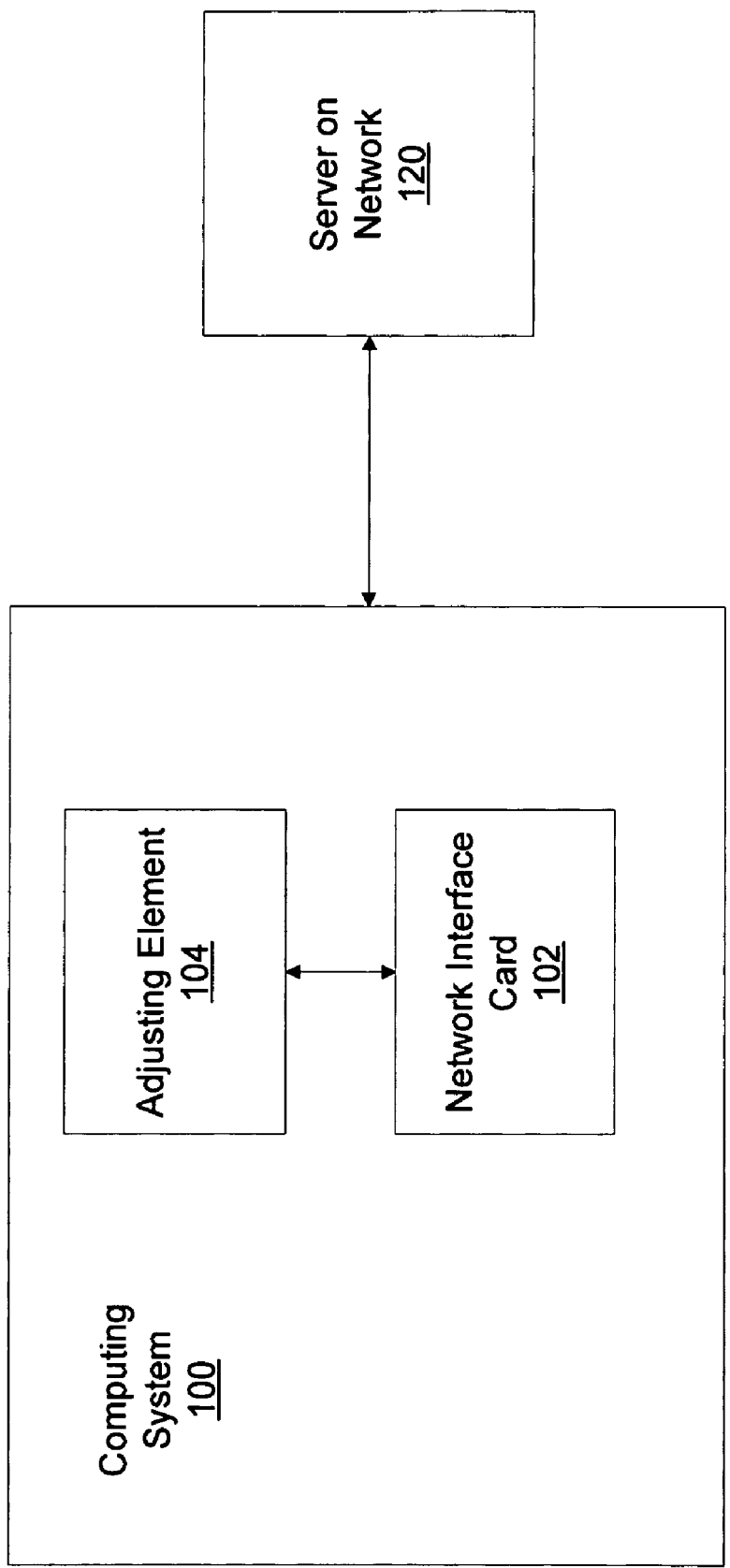
FIG. 1 is a block diagram illustrating a system according to one embodiment of the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention. In one embodiment, the system 100 is a wireless computing system, such as a laptop.

System 100 includes a network interface card (NIC) 102 and an adjusting element 104 to adjust a duty cycle of the NIC 102. The NIC 102 communicatively couples the system 100 to a network. The NIC 102 includes an active mode and a sleep mode. In one embodiment, the NIC 102 includes an active mode and a sleep mode according to the IEEE (Institute of Electrical and Electronics Engineers) 802.11 specification. In the sleep mode, the NIC is in a low power state. The NIC wakes up and goes into the active mode when it receives a request to receive or transmit data. The duty cycle of the active time compared to the sleep time of the NIC determines the amount of power savings for system 100. The duty cycle may be adjusted to minimize power consumption and maximize the amount of power savings.

The adjusting element 104 may be a device or an application running on system 100. The adjusting element 104 checks to see if system 100 is primarily connected to a wireless network. If so, the adjusting element 104 may adjust the duty cycle of the active time of the NIC 102 to minimize power consumption. The adjusting element 104 may adjust the data rate of data transfers to system 100 to make the data traffic as bursty as possible. For example, the adjusting element may request from a server on the network 120 a large amount of data in a stream for a streaming application. The request for data is sent along with any necessary streaming requirements, such as the data rate. The data received in response to this request may then be buffered, and the NIC 102 may go into sleep mode for a period of time while the data is being consumed. Then, a request for more data would be sent to the server on the network. The streaming server would stream more data to system 100 and the NIC 102 would wake up to receive this data. The data is buffered and the NIC 102 may go into sleep mode again until most of the data is consumed. More data is then requested, the NIC goes back into active mode, and the process is repeated. This process may be used with various types of messages and transmissions, including but not limited to Transmission Control Protocol (TCP) transmissions and User Datagram Protocol (UDP) messages. Broadcast and multicast messages may also be buffered and transmitted using this process. Large file transfers, such as JPEG, Word, or Powerpoint files, may be transferred using this process. By using this process, the data traffic is as bursty as possible and power consumption is minimized.

Figure 2:
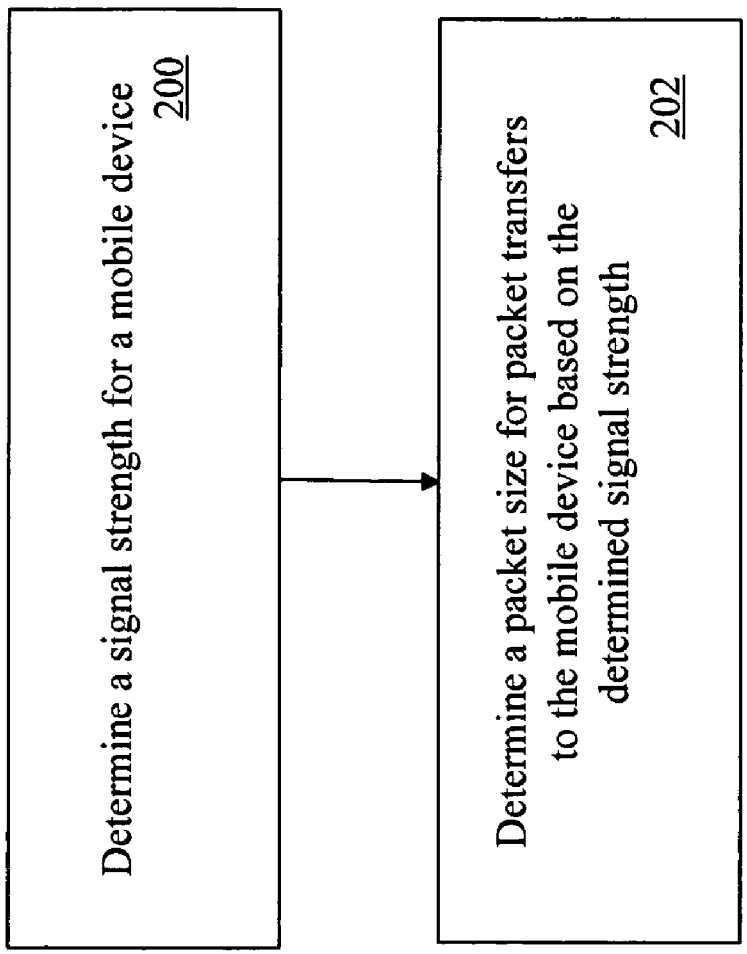
FIG. 2 is a flow diagram illustrating a method according to an embodiment of the invention.

FIG. 2 illustrates a method according to one embodiment of the invention. An adjusting element, such as an application, may determine whether a computing device is communicatively coupled to a wireless network. If so, at 200, the signal strength of the computing device is determined. When the distance between a mobile computing device and an access point increases, the signal strength generally decreases, which may cause more errors in data transfers. As signal strength decreases, a smaller packet size for data transfers may be desired. Therefore, at 202, the packet size of data transfers is determined based at least in part on the determined signal strength. In one embodiment, a lookup table is checked to determined which packet size is a best match for the determined signal strength. The lookup tables may vary depending on the type or manufacturer of the NIC.

In one embodiment, the type of content to be received by the computing device is determined. For example, different types of content, such as audio or video, may be consumed at a different rate. After the type of content is determined, if the type of content is for consumption, the rate of consumption is determined. A duty cycle of the device may then be adjusted based on the packet size and consumption rate. In one embodiment, the duty cycle may be adjusted to make data traffic as bursty as possible given the determined packet size and expected consumption rate. In one embodiment, the data rate of data transfers may be adjusted to make the data traffic as bursty as possible, and power savings for the mobile device may be maximized as a result. In this way, the battery life and time of use of the mobile device is maximized while data is streamed at an appropriate rate to provide the user with a continuous stream of data for time critical applications.

Figure 3:
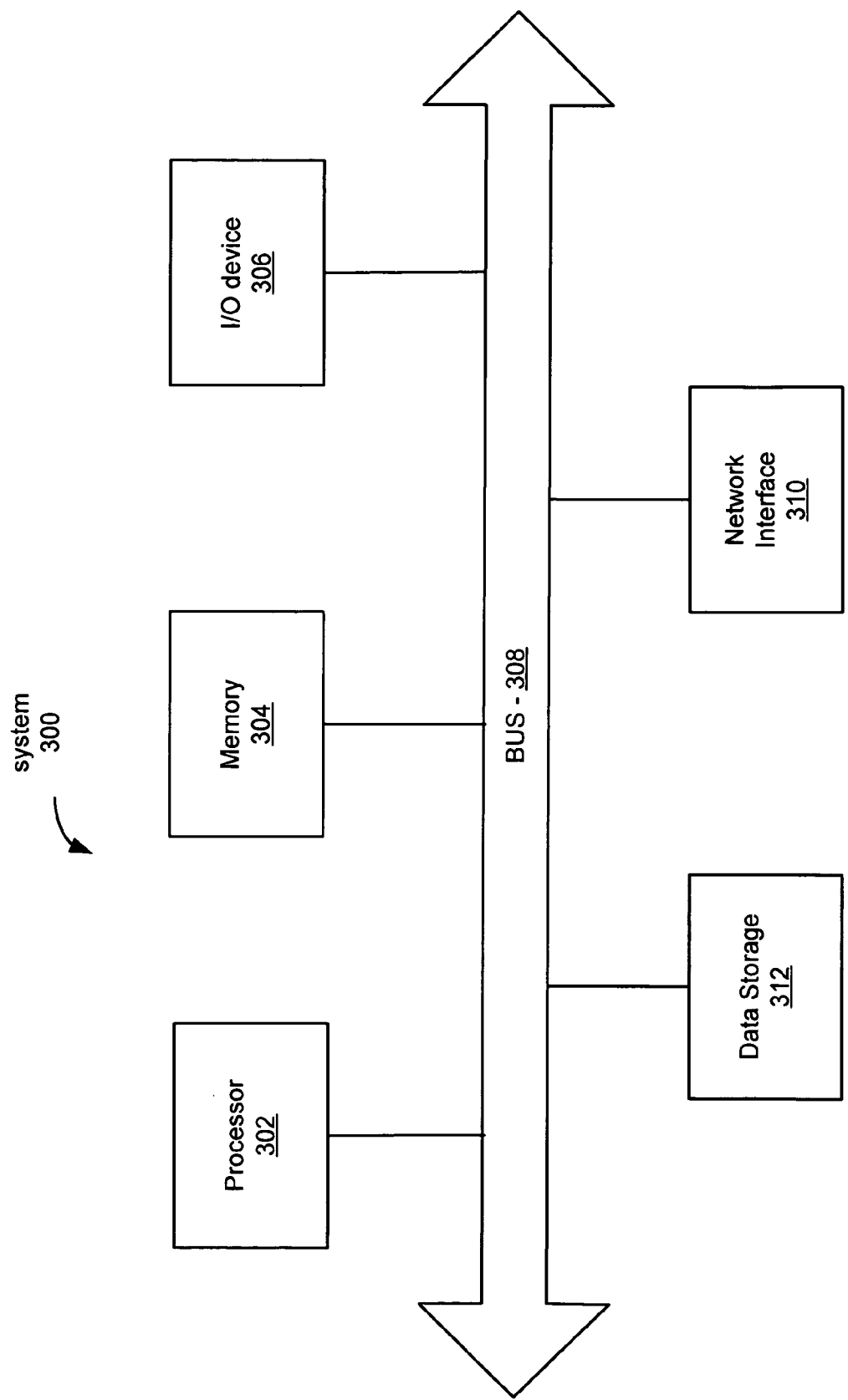
FIG. 3 is a block diagram illustrating a suitable computing environment in which certain aspects of the illustrated invention may be practiced.

FIG. 3 is a block diagram illustrating a suitable computing environment in which certain aspects of the illustrated invention may be practiced. In one embodiment, the method described above may be implemented on a computer system 300 having components 302-312, including a processor 302, a memory 304, an Input/Output device 306, a data storage device 312, and a network interface 310, coupled to each other via a bus 308. The components perform their conventional functions known in the art and provide the means for implementing the system 100. Collectively, these components represent a broad category of hardware systems, including but not limited to general purpose computer systems, mobile or wireless systems, and specialized packet forwarding devices. It is to be appreciated that various components of computer system 300 may be rearranged, and that certain implementations of the present invention may not require nor include all of the above components. Furthermore, additional components may be included in system 300, such as additional processors (e.g., a digital signal processor), storage devices, memories (e.g. flash memory), and network or communication interfaces.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus for receiving data transmission from a transmitting device through a network, the apparatus comprising:
    a network interface card (NIC) configured to communicatively couple to the network, the NIC including an active mode associated with receipt of data transmission and a sleep mode not associated with receipt of data transmission; and
    a device coupled to the NIC, the device being resident in the apparatus and configured to
        determine a data consumption rate of the apparatus to consume data received in the active model, the data being consumed at least in part while the NIC is in the sleep mode;
        determine a duty cycle of the NIC between active and sleep mode and a data transmission rate to be used by the transmitting device, the duty cycle based at least in part on the determined data consumption rate, so that during the sleep mode of the duty cycle the apparatus' consumption of the received data is continuous;
        request the transmitting device to transmit further data to be consumed by the apparatus; and
        cause the NIC to operate according to the duty cycle.

2. The apparatus of claim 1, wherein the NIC including the active and sleep modes is configured to operate in accordance with the IEEE (Institute of Electrical and Electronics Engineers) 802.11 specification.

3. The apparatus of claim 1, wherein the apparatus is a mobile apparatus.

4. The apparatus of claim 3, wherein the mobile apparatus is a laptop.

5. The apparatus of claim 1, wherein the device coupled to the NIC is further configured to determine a signal strength for the apparatus and determine a packet size for data to be received by the apparatus based at least in part on the determined signal strength.

6. The apparatus of claim 5, wherein the device coupled to the NIC is further configured to check a lookup table to determine which packet size is a best match for the determined signal strength.

7. The apparatus of claim 1, wherein the device coupled to the NIC is further configured to determine a content type of content of the data to be received by the apparatus.

8. The apparatus of claim 7, wherein the device coupled to the NIC is further configured to determine the consumption rate and a packet size based at least in part on the content type of content of the data to be received by the apparatus.

9. An article of manufacture comprising:
    a tangible computer readable storage medium; and
    a plurality of programming instructions stored on the storage medium and configured to enable a machine operatively configured for receiving data transmission from a transmitting device through a network, the machine having an active mode associated with receipt of data transmission and a sleep mode not associated with receipt of data transmission, to
        determine a data consumption rate of the machine, wherein the machine consumes data received in the active mode at the data consumption rate, while the NIC is in the sleep mode;
        determine a duty cycle of the machine between active and sleep mode and a data transmission rate to be used by the transmitting device, the duty cycle based at least on the determined data consumption rate of the machine, so that during the sleep mode of the duty cycle the machine's consumption of the received data is continuous;
        request the transmitting device to transmit further data to be consumed by the machine;
        receive the data requested for when the machine is in the active mode; and consume the received data when the machine is in the sleep mode.

10. The article of manufacture of claim 9, wherein the programming instructions are further configured to enable the machine to determine the duty cycle of the machine based at least in part on minimizing power consumption.

11. The article of manufacture of claim 9, wherein the programming instructions are further configured to enable the machine to determine a signal strength for the machine.

12. The article of manufacture of claim 11, wherein the programming instructions are further configured to enable the machine to determine a packet size for data to be received by the machine based at least in part on the determined signal strength.

13. The article of manufacture of claim 9, wherein the programming instructions are further configured to enable the machine to determine a type of content of the data to be received by the machine and determine a packet size for the data to be received by the machine based at least in part on the content type.

14. The article of manufacture of claim 13, wherein the programming instructions are further configured to enable the machine to determine the consumption rate based at least in part on the type of content of the data to be received by the machine.

15. A method comprising:
  determining, by a computing device, a data consumption rate of the computing device, wherein the computing device is configured to receive data transmission from a transmitting device through a network and to include an active mode associated with receipt of data transmission and a sleep mode not associated with receipt of data transmission, wherein the consumption rate is the rate at which the computing device consumes data while in the sleep mode, the data being received in the active mode;
  determining, by the computing device, a duty cycle of the computing device between active and sleep mode and a data transmission rate to be used by the transmitting device, the duty cycle based at least in part on the determined data consumption rate of the computing device, so that during the sleep mode of the duty cycle the computing device's consumption of the received data is continuous;
  requesting, by the computing device, for the transmitting device to transmit further data to be consumed by the computing device;
  receiving, by the computing device, the data requested for when the computing device is in the active mode; and
  consuming, by the computing device, the received data at least when the computing device is in the sleep mode.

16. The method of claim 15, further comprising
  detecting, by the computing device, whether the computing device is coupled to a network; and
  detecting, by the computing device, signal strength of the computing device coupled to the network;
wherein the determining of the data transmission rate is based at least in part on the detected signal strength.

17. The method of claim 16, further comprising
  determining, by the computing device, a type of the data to be received by the computing device; and
  determining, by the computing device, a packet size based at least on the content type and the detected signal strength;
wherein the determining of the data consumption rate is based at least in part on the content type.

* * * * *